(12) United States Patent
Lee (10) Patent No.: US 12,505,833 B2
(45) Date of Patent: Dec. 23, 2025

(54) WAKE-UP WORD RECOGNITION TRAINING SYSTEM AND METHOD

(71) Applicant: CYBERON CORPORATION, New Taipei (TW)

(72) Inventor: Lo-Yun Lee, New Taipei (TW)

(73) Assignee: CYBERON CORPORATION, New Taipei (TW)

( * ) Notice: Subject to any disclaimer, the term of this patent is extended or adjusted under 35 U.S.C. 154(b) by 730 days.

(21) Appl. No.: 17/578,767

(22) Filed: Jan. 19, 2022

(65) Prior Publication Data

US 2022/0238102 A1 Jul. 28, 2022

(30) Foreign Application Priority Data

Jan. 22, 2021 (TW) ................. 110102529

(51) Int. Cl.
*G10L 15/187* (2013.01)
*G06F 16/334* (2025.01)
(Continued)

(52) U.S. Cl.
CPC ........ *G10L 15/187* (2013.01); *G06F 16/3343* (2019.01); *G06N 3/08* (2013.01);
(Continued)

(58) Field of Classification Search
CPC ..... G10L 15/187; G10L 15/02; G10L 15/063; G10L 15/16; G10L 15/22; G10L 15/30;
(Continued)

(56) References Cited

U.S. PATENT DOCUMENTS 10,950,228 B1\* 3/2021 Tan .................. G06F 3/167
11,132,992 B2\* 9/2021 Stoimenov ............ G06N 3/045
(Continued)

FOREIGN PATENT DOCUMENTS

| CN | 109637537 A | 4/2019 |
|----|-------------|--------|
| CN | 109741735 A | 5/2019 |
| CN | 110364143 A | 10/2019 |

OTHER PUBLICATIONS

Chinese Office Action mailed Feb. 15, 2025 in counterpart Chinese application CN 202210026198.5, 7 pages in Chinese.

*Primary Examiner* — Michael Colucci
(74) *Attorney, Agent, or Firm* — Juan Carlos A. Marquez; Marquez IP Law Office, PLLC (57) ABSTRACT

A wake-up word recognition training system includes: a sentence database, storing a plurality of sentences and a phoneme sequence and a speech signal corresponding to each of the sentences; a phoneme disassembly module, disassembling a wake-up word inputted from the outside to obtain a wake-up word phoneme sequence; a phoneme analysis module, matching the wake-up word phoneme sequence to the sentences and/or phoneme sequences thereof, to obtain wake-up word part-of-speech sentences and non-wake-up word part-of-speech sentences; a sentence classification module, dividing the sentences in the sentence database into the wake-up word part-of-speech sentences and the non-wake-up word part-of-speech sentences according to a comparison result of the phoneme comparison module; and a wake-up word recognition module, obtaining speech signal fragments of the wake-up word and a non-wake-up word according to a phoneme combination of the wake-up word part-of-speech sentences and the non-wake-up word part-of-speech sentences.

10 Claims, 5 Drawing Sheets

(51) Int. Cl.
  *G06N 3/08* (2023.01)
  *G10L 15/02* (2006.01)
  *G10L 15/06* (2013.01)
  *G10L 15/08* (2006.01)
  *G10L 15/16* (2006.01)
  *G10L 15/22* (2006.01)
  *G10L 15/30* (2013.01)

(52) U.S. Cl.
  CPC ............ *G10L 15/02* (2013.01); *G10L 15/063* (2013.01); *G10L 15/16* (2013.01); *G10L 15/22* (2013.01); *G10L 15/30* (2013.01); *G10L 2015/025* (2013.01); *G10L 2015/088* (2013.01)

(58) Field of Classification Search
  CPC ......... G10L 2015/025; G10L 2015/088; G10L 15/08; G10L 2015/223; G06F 16/3343; G06F 16/3329; G06F 16/90332; G06N 3/08
  See application file for complete search history.

(56) References Cited

U.S. PATENT DOCUMENTS

| | | | |
|---|---|---|---|
| 11,425,412 B1* | 8/2022 | Gigliotti | H04N 19/17 |
| 2020/0013407 A1* | 1/2020 | Chae | G06F 3/167 |
| 2021/0065699 A1* | 3/2021 | Kaushik | G10L 15/16 |
| 2021/0174794 A1* | 6/2021 | Mont-Reynaud | G10L 15/22 |
| 2022/0277752 A1* | 9/2022 | Zhang | G10L 17/04 |
| 2023/0017927 A1* | 1/2023 | Roh | G10L 15/26 |

* cited by examiner

WAKE-UP WORD RECOGNITION TRAINING SYSTEM AND METHOD

BACKGROUND

Technical Field

The present invention relates to a wake-up word recognition training system and method for performing wake-up word recognition training by using a speech recognition model.

Related Art

In recent years, the development of automatic speech recognition (ASR) has gradually matured (for example: speech recognition of Google or Siri). In operating an electronic product such as a mobile device or a personal computer, users more frequently use the function of speech input or speech control. However, in a previous speech recognition technology, a neural network is usually trained by using marked data or key information, usually having problems of excessive time consumption and low accuracy in preparing training data. Therefore, how to increase the accuracy of a wake-up word recognition model without spending too much processing time is one of the problems to be alleviated in this field.

For a conventional method, the improvement in the hit rate of a "wake-up word" requires a large number of people to record speech data of the "wake-up word", so as to fine-tune a deep learning model. In addition, because speech data of each "wake-up word" is independent, a "wake-up word" needs to be changed by repeating the above operation, usually being time-consuming and laborious. In view of this, it is an important issue to provide a type of process automation and reduce the occurrence of human errors.

SUMMARY

The present invention provides a wake-up word recognition training system and method, capable of saving the trouble of recording speech data, automating the process, and reducing the probability of occurrence of human errors.

The present invention provides a wake-up word recognition training system, including a sentence database, a phoneme disassembly module, a phoneme analysis module, and a wake-up word recognition module, where the sentence database stores a plurality of sentences and a phoneme sequence and a speech signal corresponding to each of the sentences; the phoneme disassembly module disassembles a wake-up word inputted from the outside to obtain a wake-up word phoneme sequence; the phoneme analysis module matches the wake-up word phoneme sequence to the sentences and/or phoneme sequences thereof, to obtain wake-up word part-of-speech sentences and non-wake-up word part-of-speech sentences; and the wake-up word recognition module filters speech signal fragments and constructs a deep neural network model according to a phoneme combination of the wake-up word part-of-speech sentences and the non-wake-up word part-of-speech sentences, and trains the deep neural network model according to phoneme sequences and signal fragments thereof of the wake-up word part-of-speech sentences and the non-wake-up word part-of-speech sentences, to establish a wake-up word recognition model.

In an embodiment of the present invention, the foregoing phoneme analysis module comprises a phoneme comparison module and a sentence classification module; the phoneme comparison module compares the sentences and the phoneme sequences in the sentence database according to the wake-up word phoneme sequence; and the sentence classification module divides the sentences in the sentence database into the wake-up word part-of-speech sentences and the non-wake-up word part-of-speech sentences according to a comparison result of the phoneme comparison module.

In an embodiment of the present invention, constituent units of the foregoing phoneme sequence comprise a sequence of three consecutive phonemes, a sequence of two consecutive phonemes, and/or a single phoneme.

In an embodiment of the present invention, the foregoing wake-up word recognition module includes a generic speech recognition module and a dynamic programming algorithm, and speech signal fragments of phoneme sequences corresponding to the sentences of the wake-up word in the sentence database are found out to serve as training data about the wake-up word for the deep neural network model by the generic speech recognition module cooperating with the dynamic programming algorithm.

In an embodiment of the present invention, sentences corresponding to a non-wake-up word and/or speech signal fragments of phoneme sequences thereof in the sentence database are found out to serve as training data about the non-wake-up word for the deep neural network model by the foregoing wake-up word recognition module using a method of text comparison.

The present invention provides a wake-up word recognition training method, comprising: disassembling, by using a phoneme disassembly module, a wake-up word inputted from the outside to obtain a wake-up word phoneme sequence; matching, by using a phoneme analysis module, the wake-up word phoneme sequence to each of a plurality of sentences and/or phoneme sequences corresponding to the sentences, to obtain wake-up word part-of-speech sentences and non-wake-up word part-of-speech sentences; constructing, by using a wake-up word recognition module, a deep neural network model according to a phoneme combination of the wake-up word part-of-speech sentences and the non-wake-up word part-of-speech sentences, and training the deep neural network model according to phoneme sequences and signal fragments thereof of the wake-up word part-of-speech sentences and the non-wake-up word part-of-speech sentences, to establish a wake-up word recognition model.

In an embodiment of the present invention, constituent units of the foregoing phoneme sequence comprise a sequence of three consecutive phonemes, a sequence of two consecutive phonemes, and/or a single phoneme.

In an embodiment of the present invention, the foregoing wake-up word recognition module includes a generic speech recognition module and a dynamic programming algorithm, and phoneme sequence fragments corresponding to the sentences of the wake-up word in the sentence database are found out to serve as training data for the deep neural network model by the generic speech recognition module cooperating with the dynamic programming algorithm.

In an embodiment of the present invention, sentences corresponding to a non-wake-up word and/or phoneme sequence fragments thereof in the sentence database are found out to serve as training data about the non-wake-up word for the deep neural network model by the foregoing wake-up word recognition module using a method of text comparison.

In an embodiment of the present invention, the foregoing matching, by using a phoneme analysis module, the wake-up word phoneme sequence to each of a plurality of sentences and/or phoneme sequences corresponding to the sentences, to obtain wake-up word part-of-speech sentences and non-wake-up word part-of-speech sentences comprises: comparing, by using a phoneme comparison module, the sentences and the phoneme sequences in the sentence database according to the wake-up word phoneme sequence; and obtaining, by using a sentence classification module, the wake-up word part-of-speech sentences and the non-wake-up word part-of-speech sentences from the sentences according to a comparison result of the phoneme comparison module.

DETAILED DESCRIPTION

To make the features and advantages of the present invention clear and easy to understand, the following gives a detailed description of embodiments with reference to accompanying drawings.

Figure 1:
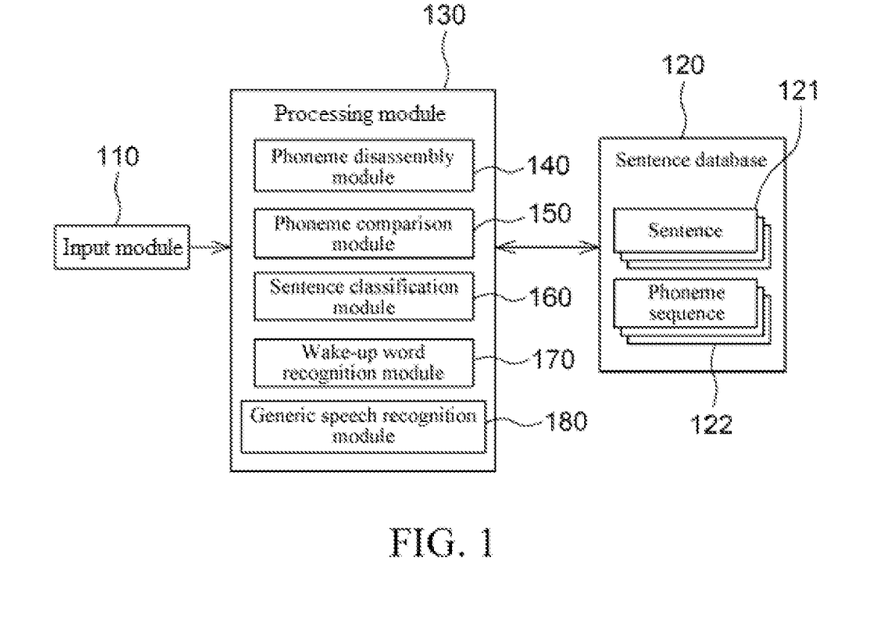
FIG. 1 is a schematic block diagram of elements of a system according to the present invention.

FIG. 1 is a schematic block diagram of elements of a system according to the present invention. In FIG. 1, a wake-up word recognition training system includes an input module 110, a sentence database 120, and a processing module 130, where the processing module 130 includes a phoneme disassembly module 140, a phoneme comparison module 150, a sentence classification module 160, a wake-up word recognition module 170 and a generic speech recognition module 180.

The input module 110 obtains a wake-up word; the sentence database 120 stores a plurality of sentences 121 and corresponding phoneme sequences 122; the phoneme disassembly module 140 disassembles the wake-up word to obtain a wake-up word phoneme sequence; the phoneme comparison module 150 compares the sentences 121 and phoneme sequences 122 thereof according to the wake-up word phoneme sequence; the sentence classification module 160 divides the sentences 121 in the sentence database into wake-up word part-of-speech sentences and non-wake-up word part-of-speech sentences according to a comparison result of the phoneme comparison module 150; and the wake-up word recognition module 170 extracts, by using the generic speech recognition module 180 and a dynamic programming algorithm, speech signal fragments of the wake-up word phoneme sequence from the wake-up word part-of-speech sentences according to a classification result of the sentence classification module 160, and obtains signal fragments of a non-wake-up word phoneme sequence from the non-wake-up word part-of-speech sentences by using a method of text comparison; and further imports a deep neural network model, and trains the deep neural network model and establishes a wake-up word recognition model by using the two types of speech signal fragments according to a result of the wake-up word recognition module 170.

In this embodiment, the wake-up word recognition model further includes a generic speech recognition module 180, through which the speech signal fragments of the wake-up word phoneme sequence are extracted from the wake-up word part-of-speech sentences in cooperation with the dynamic programming algorithm, to serve as training data about the wake-up word.

Figure 2:
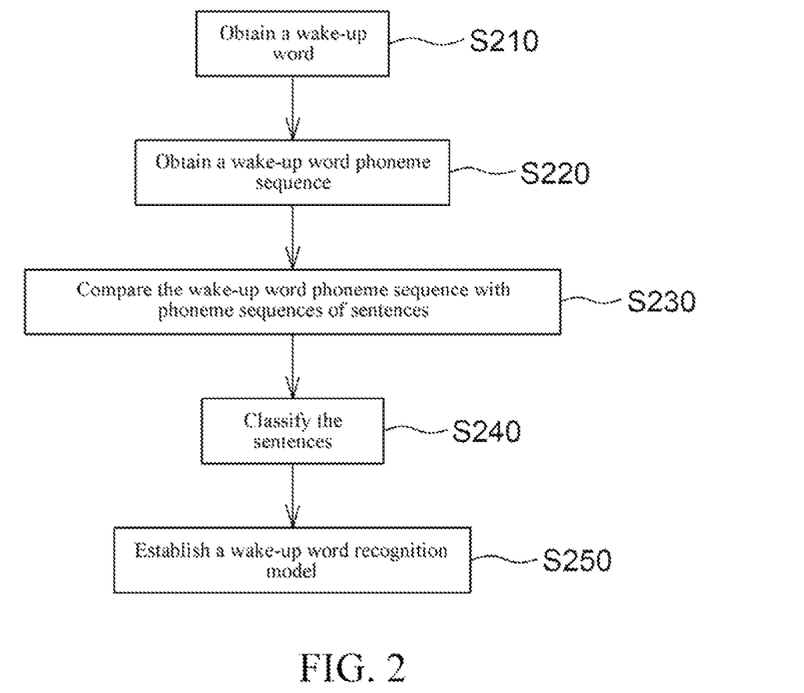
FIG. 2 is a flowchart of steps according to an embodiment of the present invention.
Figure 3:
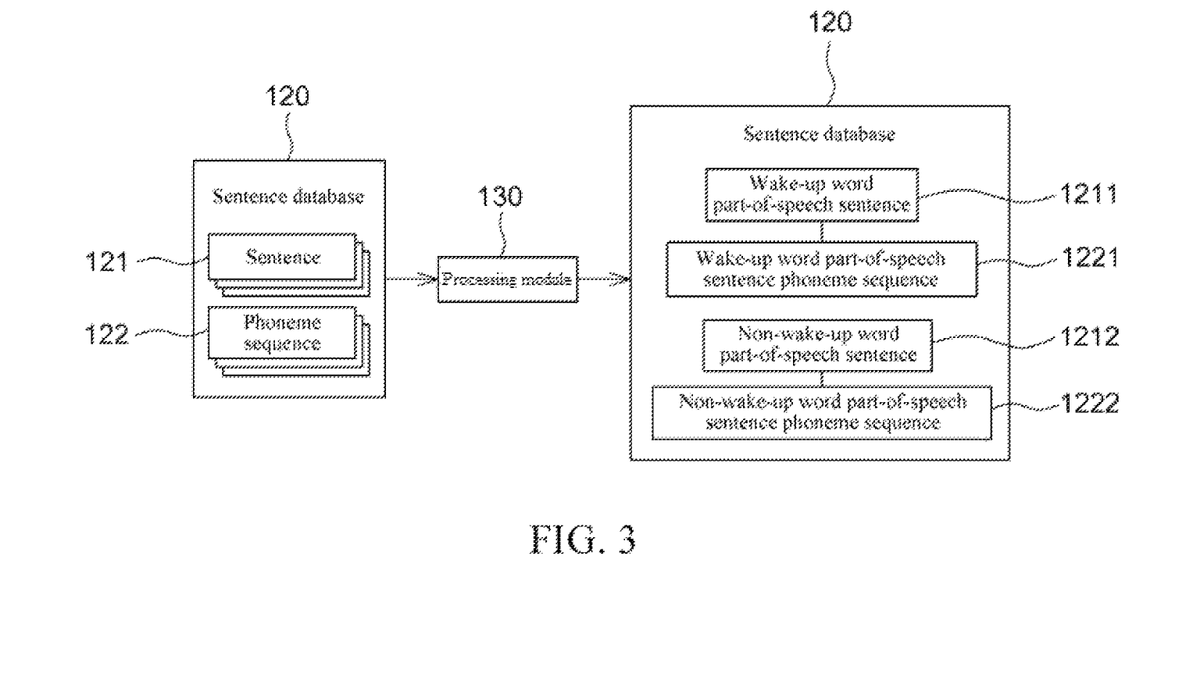
FIG. 3 is a schematic diagram of the classification in a sentence database by a processing module of the present invention.
Figure 4A:
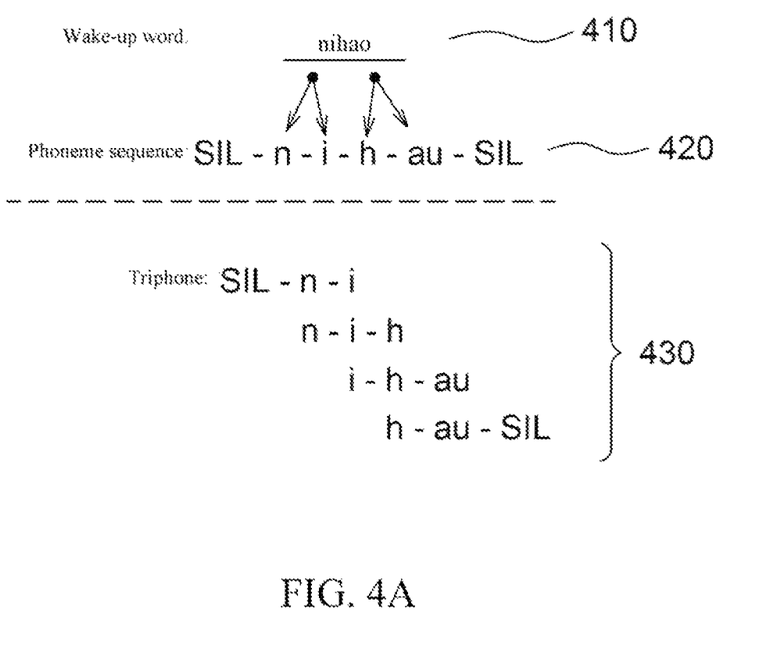
FIG. 4A and FIG. 4B are schematic diagrams of relationships between wake-up words and phoneme sequences of the present invention.
Figure 4B:
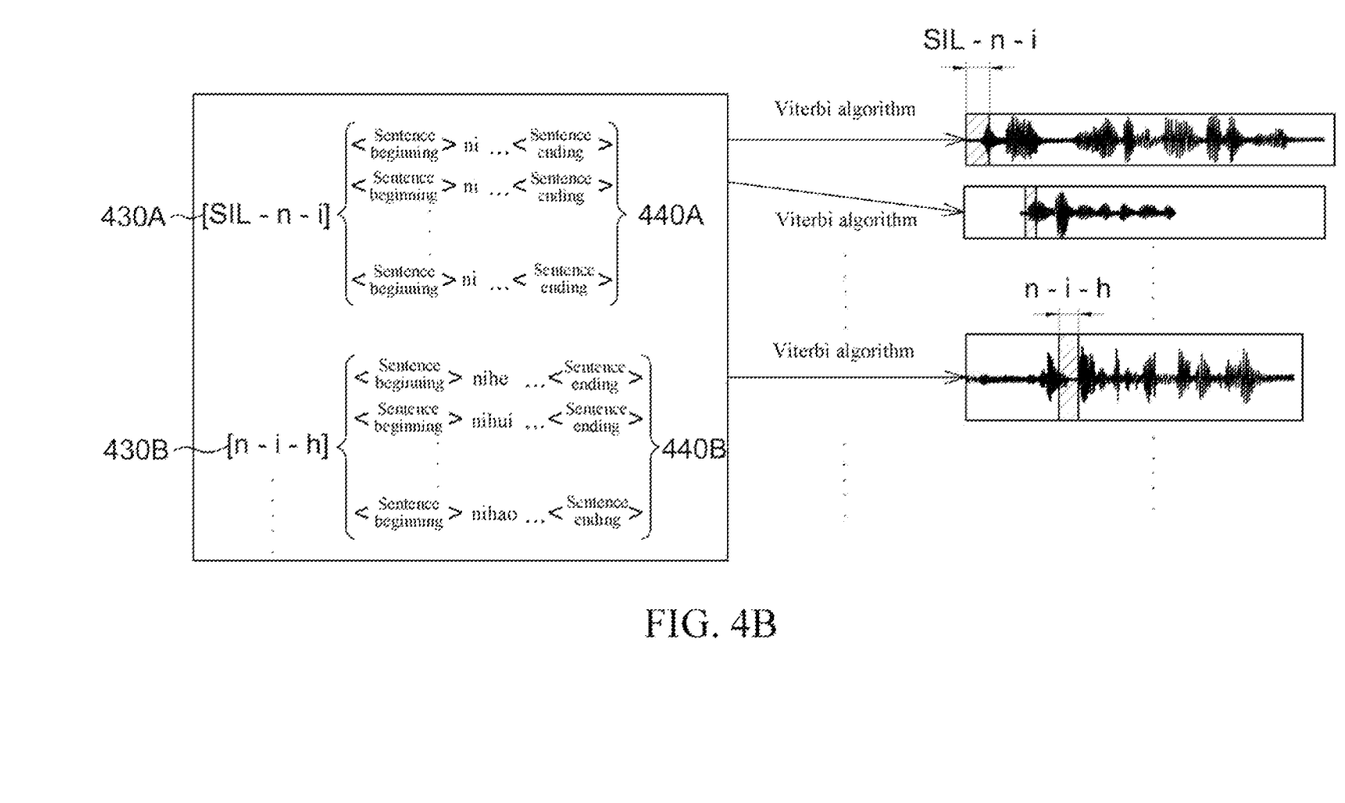

FIG. 2 is a flowchart of steps according to an embodiment of the present invention. FIG. 3 is a schematic diagram of the classification in a sentence database by a processing module of the present invention. FIG. 4A and FIG. 4B are schematic diagrams of relationships between wake-up words and phoneme sequences of the present invention. For better understanding, reference may be made to FIG. 2 to FIG. 4B together.

In FIG. 2, main steps of a wake-up word recognition training method are as follows:

Step S210: Obtain a wake-up word.

In this embodiment, text input or using a speech input device, such as a microphone, to input a personalized wake-up word may be a main way to obtain a wake-up word. In an embodiment of the present invention, "nihao" is used as an example for description.

In the present invention, the wake-up word is not limited to greetings, and the wake-up word may alternatively be replaced with a similar concept, including: a keyword with a specific purpose, a speech command, a trigger word, a human name or a title.

Step S220: Obtain a wake-up word phoneme sequence.

In this embodiment, after a wake-up word 410 "nihao" is obtained, a phoneme disassembly module of a processing module is used to disassemble the wake-up word 410 "nihao" to obtain a wake-up word phoneme sequence 420, and SIL-n-i-h-au-SIL can be obtained by analyzing the wake-up word phoneme sequence 420, where SIL is a silent phoneme, and the phoneme sequence may be three consecutive phonemes (triphone), two consecutive phonemes (right-context dependent or left-context dependent), or a single phoneme. In this embodiment, a sequence of three phonemes is adopted, so that a phoneme combination 430 including 4 groups of phonemes "SIL-n-i", "n-i-h", "i-h-au", and "h-au-SIL" can be obtained (reference is made to FIG. 4A).

Step S230: Compare the wake-up word phoneme sequence with phoneme sequences of sentences.

In this embodiment, a phoneme comparison module is used to compare a plurality of sentences in the sentence database and a phoneme sequence corresponding to each of the sentences according to the wake-up word phoneme sequence. In this step, the sequence of three consecutive phonemes in SIL-n-i-h-au-SIL obtained by analyzing the wake-up word phoneme sequence 420 is mainly used, that is, the 4 groups of phonemes "SIL-n-i", "n-i-h", "i-h-au", and "h-au-SIL" described above.

Step S240: Classify the sentences.

Following the previous step, a sentence classification module, according to a comparison result of the phoneme comparison module, marks a sentence as a wake-up word part-of-speech sentence 1211 if the sentence has the same wake-up word phoneme sequence, and the wake-up word part-of-speech sentence corresponds to a wake-up word part-of-speech sentence phoneme sequence 1221; otherwise, marks a sentence as a non-wake-up word part-of-speech sentence 1212 if the sentence does not belong to a wake-up word category after comparison, and the non-wake-up word part-of-speech sentence corresponds to a non-wake-up word part-of-speech sentence phoneme sequence 1222.

The non-wake-up word part-of-speech sentence phoneme sequence 1222 may alternatively be another phoneme combination, a filling model, or a wake-up word adversarial model.

Step S250: Establish a wake-up word recognition model.

The wake-up word recognition module imports a deep neural network model, and according to the wake-up word part-of-speech sentence phoneme sequence of the wake-up word part-of-speech sentence, the non-wake-up word part-of-speech sentence phoneme sequence of the non-wake-up word part-of-speech sentence, and the signal fragments of the wake-up word part-of-speech sentence and the non-wake-up word part-of-speech sentence, trains the deep neural network model and establishes a wake-up word recognition model.

In this embodiment, the speech signal fragments of the phoneme sequences corresponding to the sentences of the wake-up word in the wake-up word part-of-speech sentence phoneme sequence 1221 in the sentence database are found out to serve as the training data for the deep neural network model by the wake-up word recognition module using a dynamic programming algorithm in combination with the non-wake-up word part-of-speech sentence phoneme sequence 1222 and a speech signal thereof.

Referring to FIG. 4B, by using "SIL-n-i" of a phoneme combination 430A, a corresponding sentence combination 440A in the sentence database can be obtained; and by further using "n-i-h" of a phoneme combination 430B, a corresponding sentence combination 440B in the sentence database can be further obtained.

In this embodiment, the corresponding phoneme sequence and signal fragment in the sentence database are obtained by mainly using a Viterbi algorithm.

The deep neural network model is trained by further using a stochastic gradient descent algorithm.

The dynamic programming algorithm includes but is not limited to a Viterbi algorithm or dynamic time warping. The Viterbi algorithm is a dynamic programming algorithm used to find a Viterbi path most likely to produce a sequence of observed events. The Viterbi algorithm is a dynamic programming algorithm used to find an observation result most likely to explain a correlation, while the dynamic time warping is a pragmatic method for classifying two signals of different time lengths. Alignments provided by the dynamic time warping can effectively match the two signals, thereby calculating a similarity between the two signals.

In summary, in the present invention, recognition training on the structure of the deep neural network model has the following advantages:

1. Require a relatively small number of people to record speech data.
2. Customize an exclusive wake-up word.
3. Reduce the production cost and time of a "wake-up word" recognition system.
4. Improve a hit rate of the "wake-up word" recognition system.

Although the present invention is disclosed above with the foregoing embodiments, the embodiments are not intended to limit the present invention. Changes and modifications equivalent to replacements made by anyone familiar with related arts without departing from the spirit and scope of the present invention shall still fall within the patent protection scope of the present invention.

What is claimed is:

1. A wake-up word recognition training system, comprising:
   a sentence database, storing a plurality of sentences and a phoneme sequence and a speech signal corresponding to each of the sentences;
   a phoneme disassembly module, disassembling a wake-up word inputted from the outside to obtain a wake-up word phoneme sequence;
   a phoneme analysis module, matching the wake-up word phoneme sequence to the sentences and/or phoneme sequences thereof, to obtain wake-up word part-of-speech sentences and non-wake-up word part-of-speech sentences; and
   a wake-up word recognition module, constructing a deep neural network model according to a phoneme combination of the wake-up word part-of-speech sentences and the non-wake-up word part-of-speech sentences, and training the deep neural network model according to phoneme sequences and speech signals of the wake-up word part-of-speech sentences and the non-wake-up word part-of-speech sentences, to establish a wake-up word recognition model;
   wherein the wake-up word recognition training system includes an input module, a sentence database, and a processing module, where the processing module includes a phoneme disassembly module, a phoneme comparison module, a sentence classification module, a wake-up word recognition module and a generic speech recognition module; and
   wherein text input or at least one of a speech input device and a microphone is used to input a personalized wake-up word to obtain the wake-up word.

2. The wake-up word recognition training system according to claim 1, wherein the phoneme analysis module comprises a phoneme comparison module and a sentence classification module; the phoneme comparison module compares the sentences and the phoneme sequences in the sentence database according to the wake-up word phoneme sequence; and the sentence classification module divides the sentences in the sentence database into the wake-up word part-of-speech sentences and the non-wake-up word part-of-speech sentences according to a comparison result of the phoneme comparison module.

3. The wake-up word recognition training system according to claim 1, wherein constituent units of the phoneme sequence comprise a sequence of three consecutive phonemes, a sequence of two consecutive phonemes, and/or a single phoneme.

4. The wake-up word recognition training system according to claim 1, wherein phoneme sequences and speech signal fragments corresponding to the sentences of the wake-up word in the wake-up word part-of-speech sentences of the sentence database are found out to serve as training data about the wake-up word for the deep neural network model by the wake-up word recognition module using a generic speech recognition module and a dynamic programming algorithm.

5. The wake-up word recognition training system according to claim 4, wherein sentences corresponding to a non-wake-up word and/or speech signal fragments of phoneme sequences thereof in the sentence database are found out to serve as training data about the non-wake-up word for the deep neural network model by the wake-up word recognition module using a method of text comparison.

6. A wake-up word recognition training method, comprising
   disassembling, by using a phoneme disassembly module, a wake-up word inputted from the outside to obtain a wake-up word phoneme sequence;
   matching, by using a phoneme analysis module, the wake-up word phoneme sequence to each of a plurality of sentences and/or phoneme sequences corresponding to the sentences, to obtain wake-up word part-of-speech sentences and non-wake-up word part-of-speech sentences; and
   constructing, by using a wake-up word recognition module, a deep neural network model according to a phoneme combination of the wake-up word part-of-speech sentences and the non-wake-up word part-of-speech sentences, and training the deep neural network model according to phoneme sequences and speech signals of the wake-up word part-of-speech sentences and the non-wake-up word part-of-speech sentences, to establish a wake-up word recognition model;
   wherein the wake-up word recognition training system includes an input module, a sentence database, and a processing module, where the processing module includes a phoneme disassembly module, a phoneme comparison module, a sentence classification module, a wake-up word recognition module and a generic speech recognition module; and
   wherein text input or at least one of a speech input device and a microphone is used to input a personalized wake-up word to obtain the wake-up word.

7. The wake-up word recognition training method according to claim 6, wherein constituent units of the phoneme sequence comprise a sequence of three consecutive phonemes, a sequence of two consecutive phonemes, and/or a single phoneme.

8. The wake-up word recognition training method according to claim 6, wherein phoneme sequences and speech signal fragments corresponding to the sentences of the wake-up word in the wake-up word part-of-speech sentences of the sentence database are found out to serve as training data about the wake-up word for the deep neural network model by the wake-up word recognition module using a generic speech recognition module and a dynamic programming algorithm.

9. The wake-up word recognition training method according to claim 8, wherein sentences corresponding to a non-wake-up word and/or speech signal fragments of phoneme sequences thereof in the sentence database are found out to serve as training data about the non-wake-up word for the deep neural network model by the wake-up word recognition module using a method of text comparison.

10. The wake-up word recognition training method according to claim 6, wherein the matching, by using a phoneme analysis module, the wake-up word phoneme sequence to each of a plurality of sentences and/or phoneme sequences corresponding to the sentences, to obtain wake-up word part-of-speech sentences and non-wake-up word part-of-speech sentences comprises: comparing, by using a phoneme comparison module, the sentences and the phoneme sequences in the sentence database according to the wake-up word phoneme sequence; and obtaining, by using a sentence classification module, the wake-up word part-of-speech sentences and the non-wake-up word part-of-speech sentences from the sentences according to a comparison result of the phoneme comparison module.

* * * * *